United States Patent [19]

Cartossi

[11] Patent Number: 5,551,415
[45] Date of Patent: Sep. 3, 1996

[54] CAPSULAR BASE LATERALLY CARRYING GRAPHIC ELEMENTS, FOR A COOKING UTENSIL

[75] Inventor: Ferdinando Cartossi, Baveno, Italy

[73] Assignee: Cartossi S.R.L., Novara, Italy

[21] Appl. No.: 332,862

[22] Filed: Nov. 1, 1994

[30] Foreign Application Priority Data

Nov. 4, 1993 [IT] Italy ............................. MI93U0852 U

[51] Int. Cl.⁶ ...................................................... A47J 27/00
[52] U.S. Cl. ........................ 126/390; 126/373; 220/626; 220/453; 220/912
[58] Field of Search .................................. 126/390, 344, 126/373; 220/626, 453, 912

[56] References Cited

U.S. PATENT DOCUMENTS

| | | | |
|---|---|---|---|
| 3,809,063 | 5/1974 | Hajnal | 126/390 X |
| 4,204,607 | 5/1980 | Zani | 220/68 |
| 4,596,236 | 6/1986 | Eide | 126/390 |
| 5,064,055 | 11/1991 | Bessenbach et al. | 126/390 X |
| 5,154,311 | 10/1992 | Cartossi | 126/390 X |
| 5,240,137 | 8/1993 | Figueras | 126/390 X |

FOREIGN PATENT DOCUMENTS

| | | |
|---|---|---|
| 0481303 | 4/1992 | European Pat. Off. . |
| 2690463 | 10/1993 | France . |
| 47247 | 12/1964 | Luxembourg . |
| 2014037 | 8/1979 | United Kingdom . |

*Primary Examiner*—Larry Jones
*Attorney, Agent, or Firm*—Steinberg, Raskin & Davidson, P.C.

[57] ABSTRACT

The capsular heat-radiating base for a stainless steel cooking utensil is characterised in that a lateral wall of the external stainless steel covering of the capsular base which faces the utensil is perforated to allow the metal of good conductivity contained within the capsular base to be seen, the perforations having a configuration such as to form on the outer lateral surface of the capsular base the required graphic elements.

10 Claims, 2 Drawing Sheets

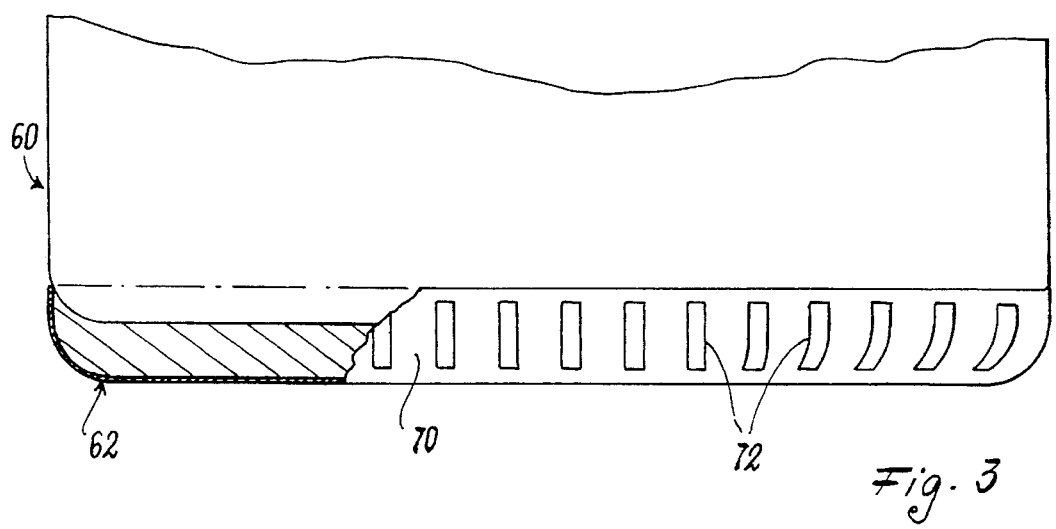
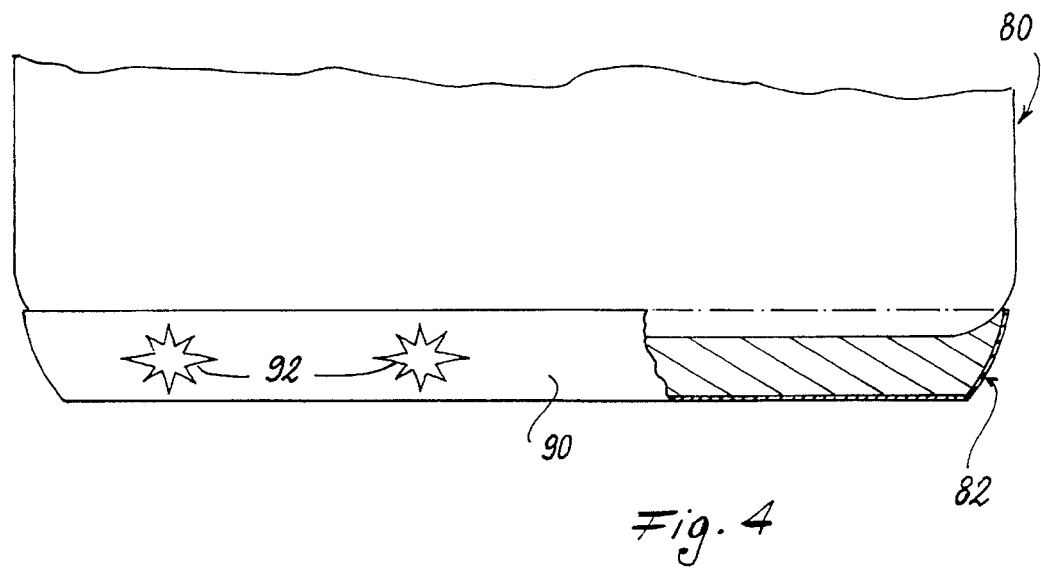

CAPSULAR BASE LATERALLY CARRYING GRAPHIC ELEMENTS, FOR A COOKING UTENSIL

BACKGROUND OF THE INVENTION

This invention relates to capsular heat-radiating bases for stainless steel cooking utensils, i.e. those bases consisting of the stainless steel base wall of the actual utensil plus a plate of good thermal conductivity metal and a stainless steel layer completely covering this plate, the entire assembly forming one piece with the utensil. The covering for the plate of good conductivity is therefore in the shape of a cup, the lateral wall of which covers and delimits the lateral edge of the plate.

It can be very useful, not only in the case of cooking utensils used industrially but also for normal domestic cooking utensils, to be able to immediately identify at a glance the origin of and the intended use for a certain utensil, especially when obligatory (as required for industrial purposes) or advisable to always use a particular utensil for the same function.

If the various utensils to be used for different purposes have the same shape and size, it becomes very difficult to quickly and reliably identify a particular utensil. It would therefore be very useful to be able to differentiate between the various utensils so that they are immediately identifiable. The requirement of immediately identifying a specific utensil also exists where various utensils of identical or similar shape and dimensions but formed from a different type of stainless steel have to be used. This requirement mainly exists industrially, but is also useful for domestic utensils, for example to differentiate with certainty between a utensil heatable by magnetic induction (the base of which is formed totally or partly of magnetizable stainless steel) and a conventional utensil of stainless steel.

Stainless steel cooking utensils sometimes carry writing and/or a symbol impressed on the outer surface of the utensil base, normally in its centre, to indicate its origin and/or use. However in order to see this the utensil has to be raised from the surface on which it rests, so that the identification of a specific utensil is not immediate.

Because of the considerable commercial availability of stainless steel saucepans and the large number of manufacturers, such manufacturers require to characterise their products by visual differences. In this respect, it is important to the manufacturer that his own products are immediately distinguishable from those of the competition without it being necessary to raise the cooking utensil in order to see the manufacturer's name and/or trademark (as stated, usually reproduced in a central position on its base surface). For this purpose the various manufacturers have developed characterisation elements such as the shape of the utensil lateral wall (cylindrical, flared, dished), the shape of the handgrips (side grips, handles, lid knobs) and the lid shape.

However these elements are not always sufficiently identifying from the viewpoint of the final user. Sometimes it is sufficient merely to remove a special-shape lid from a saucepan for this to become anonymous, i.e., without any specific identifying element. The same can happen if the saucepan is seen from a certain angle which does not show, for example, the particular shape of the handles. Again, if for any reason the handles and knobs are replaced, and these were the only characterising elements, the utensil loses its distinctive characteristics.

OBJECTS AND SUMMARY OF THE INVENTION

An object of the present invention is to provide for a cooking utensil a capsular base comprising identifying elements which are immediately perceivable at a glance, without these identifying elements possessing the aforesaid drawbacks of the known art.

A second object of the invention is to provide a capsular base carrying graphic elements on its lateral wall.

These objects are attained by the capsular heat-radiating base of the present invention, characterised in that that lateral wall of the external stainless steel covering of the capsular base which faces the utensil is perforated to allow the metal on the inside of the capsule to be seen, the perforations having a configuration such as to form on the outer lateral surface of the capsular base the required graphic elements.

The perforations in the lateral wall are shaped to form the required graphic element, which can be used not only for identifying the utensil but also for providing information on its origin and/or intended use, and also possibly constitute a decorative element. In particular, the graphic element can consist of writings, patterns, trademarks, symbols or any other requirement. The important result is that the graphic element is well visible both when the utensil is in its position of use (for example resting on a cooking hob or on a table), and when it is stored away (for example on the shelf of a kitchen cabinet).

The identifying graphic element can also be formed from a series of identical elements repeated various times along the perimeter of the capsular base.

By means of the present invention a double characterising effect is achieved, namely an effect intrinsic to the invention (the decoration on the lateral band of a capsular base applied to a cooking utensil itself identifies the utensil), and an extrinsic effect (different decorations identify different manufacturers).

BRIEF DESCRIPTION OF THE DRAWINGS

The invention will be more apparent from the description of a cooking utensil according to the invention given hereinafter with reference to the accompanying drawing, in which:

FIGS. 3 and 4 are similar to FIG. 2, but with the difference that besides comprising various graphic elements, the lateral wall of the relative capsule comprises variously convex profiles.

DETAILED DESCRIPTION OF THE INVENTION

Figure 1:
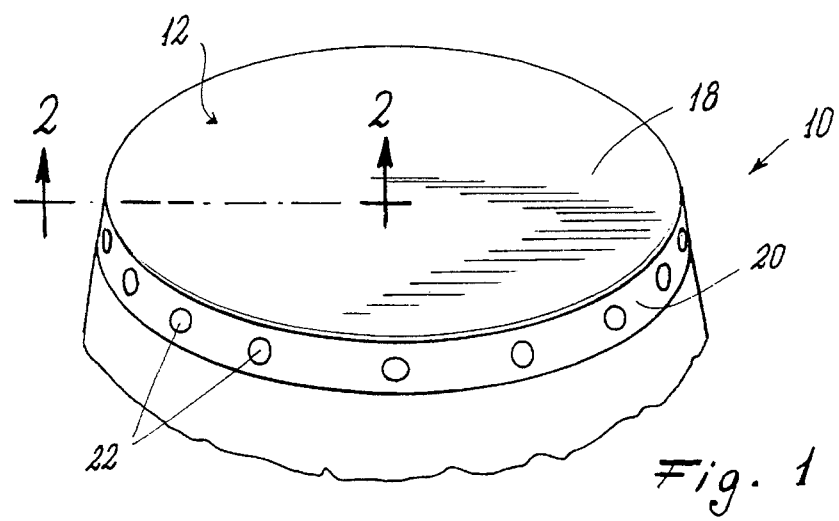
FIG. 1 is a partial perspective view of a cooking utensil with a capsular base, for convenience shown inverted and carrying on the lateral wall of the capsular base a very simple graphic element consisting of a series of circles.

In one embodiment (FIG. 1), a stainless steel utensil 10 with a capsular base 12 has its base formed by the actual base (not visible) of the utensil plus a plate (also not visible) of a metal of good thermal conductivity (such as aluminium or copper), this plate being covered externally with a stainless steel element 18 in the form of a cup. The plate is therefore "encapsulated" between the cover 18 and the actual base of the utensil (from which the expression "capsular base" derives), the capsular base forming a single piece with the utensil. Such a result can be obtained by a process consisting by way of non-limiting example of the combined effect of heating to a temperature close to the melting point of the metal of good conductivity, applying an impact pressure perpendicular to the base of the utensil, and restraining the covering layer 18 by means of a suitably shaped die.

From FIG. 1 it can be seen that perforations 22—in this particular embodiment equidistant circular perforations of equal diameter—are provided in the lateral wall 20 of the covering 18, so that as a result of the aforesaid manufacturing process the good conductivity metal 16 emerges until it becomes in line with the outer surface of the lateral wall 20 of the capsular base, to obtain on this surface a graphic element consisting of a series of equidistant circles of equal diameter. The result is particularly evident if the good conductivity metal is copper, which has a color very different from stainless steel. However the graphic element is also clearly visible if aluminium is used, particularly after initial use of the utensil. In this respect the aluminium emerging from the holes 20 oxidizes on its surface to assume an opaque appearance and a grey color decidedly darker than the stainless steel, so making it clearly distinguishable.

Other known processes can be used for applying the capsular base to the utensil, while still remaining within the scope of the present invention. For example the stainless steel covering capsule can be fixed to the plate of good conductivity metal and this then be fixed to the actual base of the cooking utensil by braze welding. Again in this case the metal on the inside of the capsule is visible through the perforations provided in the lateral wall 20 of the capsule, giving rise to the desired decorative effect.

Again within the scope of the present invention, a third metal can be interposed between the plate of good conductivity metal and the outer wall of the capsule, at least in correspondence with the perforations present in this latter, to accentuate the visual effect. This greater visual effect is further enhanced if the third metal is of a color different from stainless steel. For example the third metal could be copper if the good conductivity metal is aluminium, or could be titanium, the dark grey color of which differs substantially from the color of stainless steel.

Figure 2:
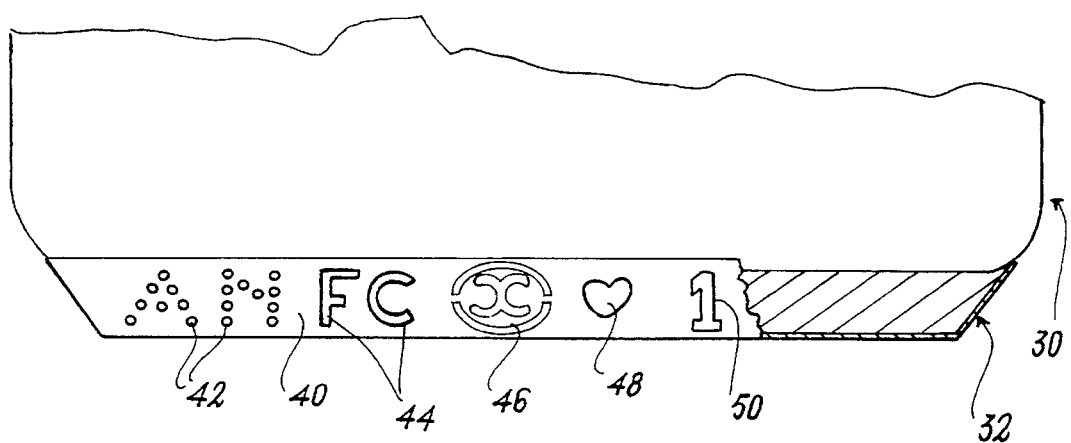
FIG. 2 is a partly cut-away partial side view of a second cooking utensil, various graphic elements obtainable by the present invention being visible on the lateral wall of its capsular base.

Perforations of a different shape can of course be used instead of the circular perforations of FIG. 1. By way of example, FIG. 2 shows a second utensil 30 the capsular base 32 of which has a lateral wall 40 comprising various types of perforations suitable for forming various graphic elements (42, 44, 46, 48, 50) obtainable by the present invention. As can be seen, graphic elements can be obtained formed from patterns, letters or writing, numbers or combinations thereof or trademarks, the limit being dictated merely by fantasy or feasibility.

A still different graphic element (72 and 92 respectively, FIGS. 3 and 4) is visible on the lateral surface (70 and 90 respectively) of the capsule (62, 82 respectively) of a third (60) and a fourth (80) utensil according to the present invention. Hence, by means of the present invention a capsular base for a cooking utensil can be obtained comprising identifying elements which are easily distinguishable even when the utensil is resting on a supporting surface, independently of the position of the handles and even if the lid is absent.

I claim:

1. A capsular heat-radiating base for a stainless steel cooking utensil, comprising an external stainless steel covering having a bottom face spaced from a surface of the utensil and a lateral peripheral wall extending between said bottom face of said covering and the surface of the utensil, a first metal member interposed between said bottom face of said covering and the surface of the utensil and having side surface regions situated contiguous with said lateral wall of said covering, and identification means for identifying the utensil, said identification means comprising a pattern of apertures in said lateral wall of said covering through which said first metal member is visible.

2. A capsular heat-radiating base as claimed in claim 1, further comprising a second metal member interposed between said first metal member and said lateral wall of said covering.

3. A capsular heat-radiating base as claimed in claim 2, wherein said first metal member is a sheet of aluminum and said second metal member is a sheet of copper.

4. A capsular heat-radiating base as claimed in claim 1, further comprising metal plate means interposed between said first metal member and said lateral wall of said covering in correspondence with said apertures in said lateral wall of said covering.

5. A capsular heat-radiating base as claimed in claim 2, wherein said first metal member is a sheet of aluminum and said second metal member is a sheet of titanium.

6. A capsular heat-radiating base as claimed in claim 1, wherein said side surface regions of said first metal member extend into said apertures to be in line with an outer surface of said lateral wall of said covering.

7. A capsular heat-radiating base as claimed in claim 1, wherein said first metal member is a sheet of copper.

8. A capsular heat-radiating base as claimed in claim 1, wherein said covering is fixedly connected to the surface of the utensil.

9. A capsular heat-radiating base as claimed in claim 1, wherein said first metal member abuts against said lateral wall of said covering.

10. A capsular heat-radiating base as claimed in claim 1, wherein the material of said first metal member is selected so that portions of said first metal member in correspondence with said apertures are visible through said apertures and contrast with said covering to thereby constitute said identification means.

\* \* \* \* \*